US008621084B2

(12) United States Patent
Buckley et al.

(10) Patent No.: US 8,621,084 B2
(45) Date of Patent: Dec. 31, 2013

(54) METHODS TO ROUTE A BEARER VIA CIRCUIT SWITCHING TO AN INTERNET PROTOCOL MULTIMEDIA SYSTEM NODE USING SESSION INITIATION PROTOCOL CONTACT HEADER

(75) Inventors: Adrian Buckley, Tracy, CA (US);
Andrew Allen, Mundelein, IL (US);
John-Luc Bakker, Keller, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 1389 days.

(21) Appl. No.: 12/110,124

(22) Filed: Apr. 25, 2008

(65) Prior Publication Data

US 2009/0268726 A1   Oct. 29, 2009

(51) Int. Cl.
*G06F 15/16* (2006.01)
(52) U.S. Cl.
USPC ............................ 709/227; 709/228; 709/229
(58) Field of Classification Search
USPC ................................................ 709/227–229
See application file for complete search history.

(56) References Cited

U.S. PATENT DOCUMENTS

| 7,710,950 | B2 | 5/2010 | Buckley et al. |
| 7,760,712 | B2 | 7/2010 | Buckley |
| 2004/0174864 | A1 | 9/2004 | Klaghofer |
| 2004/0190498 | A1 | 9/2004 | Kallio et al. |
| 2005/0058125 | A1 | 3/2005 | Mutikainen et al. |
| 2005/0083909 | A1 | 4/2005 | Kuusinen et al. |
| 2007/0058788 | A1 | 3/2007 | Mahdi et al. |
| 2007/0201441 | A1* | 8/2007 | Buckley ........................ 370/356 |
| 2007/0259651 | A1* | 11/2007 | Bae et al. .................... 455/412.1 |
| 2007/0274289 | A1 | 11/2007 | Buckley et al. |
| 2008/0080480 | A1 | 4/2008 | Buckley et al. |
| 2010/0177771 | A1 | 7/2010 | Buckley et al. |

OTHER PUBLICATIONS

3GPP TSS 24.229 v7.70 Mar. 2007 pp. 1-409.*
3GPP TSS 23.23.292 v0.4.0 Apr. 23, 2007 pp. 1-69.*
3GPP TS 24.292 V0.2.0; Title: "3rd Generation Partnership Project; Technical Specification Group Core Network and Terminals; IP Multimedia (IM) Core Network (CN) Subsystem Centralized Services (ICS)"; Stage 3; Release 8; Jul. 2008; 83 pgs.
European Search Report; EP Patent Application No. 08166162.1; Mar. 17, 2009; 8 pgs.
PCT International Preliminary Report on Patentability; PCT Application No. PCT/US2009/040858; Aug. 16, 2010; 5 pgs.
Second EP Examination Report; EP Patent Application No. 08166162.1; Jul. 27, 2010; 4 pgs.
Third European Examination Report; EP Application No. 08166162. 1; Jun. 6, 2011; 6 pages.
PCT International Search Report; PCT Application No. PCT/US2009/040858; Nov. 30, 2009; 3 pgs.

(Continued)

*Primary Examiner* — Larry Donaghue
(74) *Attorney, Agent, or Firm* — Conley Rose, P.C.; J. Robert Brown, Jr.

(57) ABSTRACT

A method of call routing is provided. The method comprises receiving a session initiation protocol (SIP) INVITE message that contains a uniform resource identifier (URI) of a called party and that identifies that a bearer for a call to the called party is to be set-up at least in part over the circuit switching domain. The method also comprises determining a digit string associated with the URI. The method also comprises sending a SIP informational response message having a contact header that contains information based on the digit string.

28 Claims, 7 Drawing Sheets

(56) References Cited

OTHER PUBLICATIONS

PCT Written Opinion of the International Searching Authority; PCT Application No. PCT/US2009/040858; 4 pgs.
European Examination Report; Application No. 08166162.1; May 9, 2012; 3 pages.
European Intent to Grant; Application No. 08166162.1; Aug. 10, 2012; 8 pages.
Canadian Office Action; Application No. 2,722,610; Mar. 18, 2013; 4 pages.
3GPP TS 23.292 V0.4.0; 3rd Generation Partnership Project; Technical Specification Group Services and System Asp; IP Multimedia Subsystem (IMS) Centralized Services; Stage 2; Release 8; Apr. 2008; 69 pages.

* cited by examiner

US 8,621,084 B2

METHODS TO ROUTE A BEARER VIA CIRCUIT SWITCHING TO AN INTERNET PROTOCOL MULTIMEDIA SYSTEM NODE USING SESSION INITIATION PROTOCOL CONTACT HEADER

STATEMENT REGARDING FEDERALLY SPONSORED RESEARCH OR DEVELOPMENT

Not applicable.

REFERENCE TO A MICROFICHE APPENDIX

Not applicable.

BACKGROUND

Advanced communication devices are capable of seamlessly operating in a packet-switched (PS) internet protocol (IP) network domain as well as in a circuit-switched (CS) cellular network domain. To facilitate this capability, current third generation partnership project (3GPP) standards specify a IP multimedia subsystem (IMS) that allows a communication device, referred to as user equipment (UE), to initiate calls to both IP-only subscribers and to conventional circuit-switched telephony subscribers using either or both of the PS network domain and the CS network domain.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
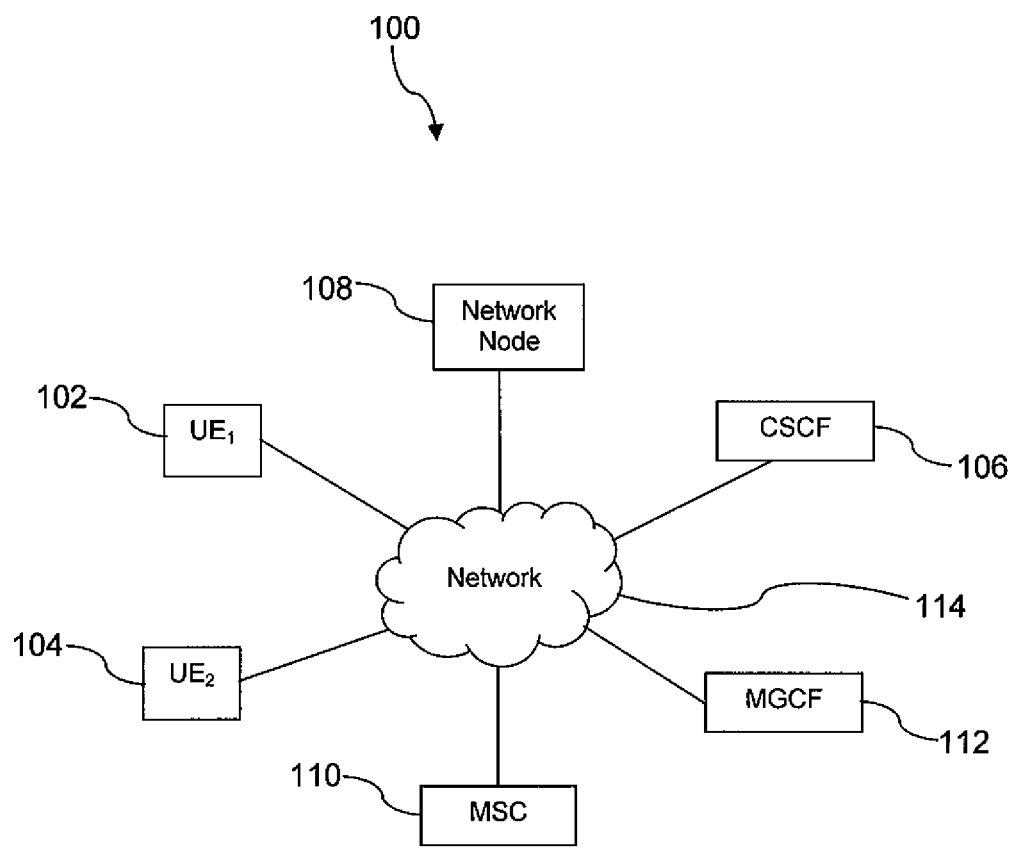
FIG. 1 illustrates a communication system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

In an embodiment, a method of call routing is provided. The method comprises receiving a session initiation protocol (SIP) INVITE message that contains a uniform resource identifier (URI) of a called party and that identifies that a bearer for a call to the called party is to be set-up at least in part over the circuit switching domain. The method also comprises determining a digit string associated with the URI. The method also comprises sending a SIP informational response message having a contact header that contains information based on the digit string. The method also comprises receiving a SIP INVITE message that contains the information based on the digit string. The method also comprises completing call set-up using the information based on the digit string. In an embodiment, the digit string may be one of an E.164 number and a private number plan (PNP) number. In other embodiments, however, the digit string may have a different format.

In another embodiment, a method of setting up a bearer over a circuit switched network is provided. The method comprises sending a SIP INVITE message that contains a URI of a called party and receiving a SIP informational response message related to the SIP INVITE message. The method also comprises analyzing a contact header or other SIP header of the SIP informational response message to determine a digit sequence and setting up the bearer over the circuit switched network using the digit sequence.

In an embodiment, a user equipment (UE) is provided. The UE comprises a processor and an application. The application, when executed by the processor, transmits a SIP INVITE message containing a URI of a called party and that identifies that a bearer for a call to the called party is to be set-up at least partially over the circuit switching domain, such identification could be a feature tag. The application also receives a SIP informational response message having a contact header that contains information based on a digit string. Those skilled in the art will appreciate that other SIP headers can also contain SIP/TEL URIs and these could be used as well to transport this digit string. The application also analyzes the information contained in the contact header (or other SIP headers) based on the digit string to determine one of an E.164 number and a PNP number. The application also transmits a call set-up message containing the one of the E.164 number and the PNP number, wherein the UE sets-up a bearer over the circuit switched domain.

In an embodiment, a server is provided. The server comprises a component to receive a session initiation protocol (SIP) INVITE message that contains a uniform resource identifier (URI) of a called party and that identifies that a bearer for a call to the called party is to be set-up at least in part over the circuit switching domain. The server also determines one of an E.164 number and a private number plan (PNP) number associated with the URI. The server also sends a SIP informational response message having a contact header that contains information based on the one of the E.164 number and the PNP number. Those skilled in the art will appreciate that other SIP headers can also contain SIP/TEL URIs and these could be used as well to transport this digit string. The server also receives a SIP INVITE message that contains the information based on the one of the E.164 number and the PNP number. The server also completes call set-up using the information based on the one of the E.164 number and the PNP number.

Turning now to FIG. 1 a communication system 100 is discussed. The system 100 comprises a first user equipment (UE) 102, a second UE 104, a call session control function (CSCF) 106, a network node 108, a mobile switching center (MSC) 110, a media gateway control function (MGCF) 112, communicating via a network 114. The system 100 provides for communication between the first UE 102 and the second UE 104. In an embodiment, a call may be set-up between the first UE 102 and the second UE 104 using first said protocol such as but not limited to internet protocol multimedia subsystem (IMS) signaling over a PS network, but a second said network such as but limited to CS network may be used to carry the bearer traffic, for example speech. A variety of IMS features, including but not limited to IMS centralized services (CS), IMS service continuity (SC), and IMS voice call continuity (VCC), may be set-up in this manner. In these circumstances, the $2^{nd}$ said protocol such as but not limited to circuit switching signaling should be routed to the correct application server, for example the network node 108, in the IMS network. The present disclosure teaches using a SIP informational response message contact header to carry the dynamic routing number to the originating UE. Those skilled in the art will appreciate that other SIP headers such as but not limited to SIP header portions such as Record-Route, and Via as shown and described herein, can also contain SIP/TEL URIs and these could be used as well to transport this digit string. In an embodiment, the SIP 183 session progress message may be used to carry the dynamic routing number in a contact header, but in other embodiments other SIP response messages may carry the dynamic routing number in their contact header or other SIP headers such as but not limited to SIP header portions such as Record-Route, and Via as shown and described herein. In some contexts herein, SIP informational response messages may be referred to as SIP 1XX messages. In an embodiment, a reason or explanation why the dynamic routing number is provided may also be included in the SIP header, e.g. in the contact header. In an embodiment, the dynamic routing number may be hashed, for example with a dialog identifier, and the hash carried by the e.g. contact header or other header of the SIP response message. In an embodiment, the dialog identifier may be composed as the combination of multiple fields or tags of the SIP messages exchanged in a SIP message session or SIP dialog, for example the combination of a SIP Call-ID header field, a SIP From header tag field, and a SIP To header tag field.

The first and second UE 102, 104 may be any of a variety of communications terminals including mobile phones and SIP-enabled phones. The UEs 102, 104 may be embodied in a wide variety of electronic devices including mobile phones, personal digital assistants, laptop computers, desktop computers, tablet computers, desk phones, and others. In an embodiment, the UE 102, 104 may be embodied in a handset. An embodiment of a handset is described in greater detail hereinafter. Alternatively, the UE 102, 104 may be embodied substantially in the form of a general purpose computer system. General purpose computer systems are discussed in greater detail hereinafter.

The CSCF 106 is an IMS element that may execute on a general purpose computer system. The CSCF 106 provides a contact point within an operator's network that promotes subscribers of the operator to register. The CSCF 106 may handle registration, routing, and forwarding of SIP messages and charging. In an embodiment, the CSCF 106 may be an interrogating CSCF (I-CSCF) and/or a serving CSCF (S-CSCF). The MGCF 112 is a component in the IMS that communicates with the call session control function (CSCF) and controls the connections for media channels in an IMS-MGW. The MGCF 112 performs protocol conversion between ISDN User Part (ISUP) and the IMS call-control protocols. As is known to those skilled in the art, some of the entities that are depicted separately in FIG. 1, for example the MGCF 112, the CSCF 106, and the network node 108, may be combined within a single device or server computer.

The MSC 110 provides circuit switching services to a wireless radio access network, for example to one or both of the UEs 102, 104 via a base transceiver station (BTS) (not shown). The MSC 110 links the radio access network to the network 114.

Figure 2:
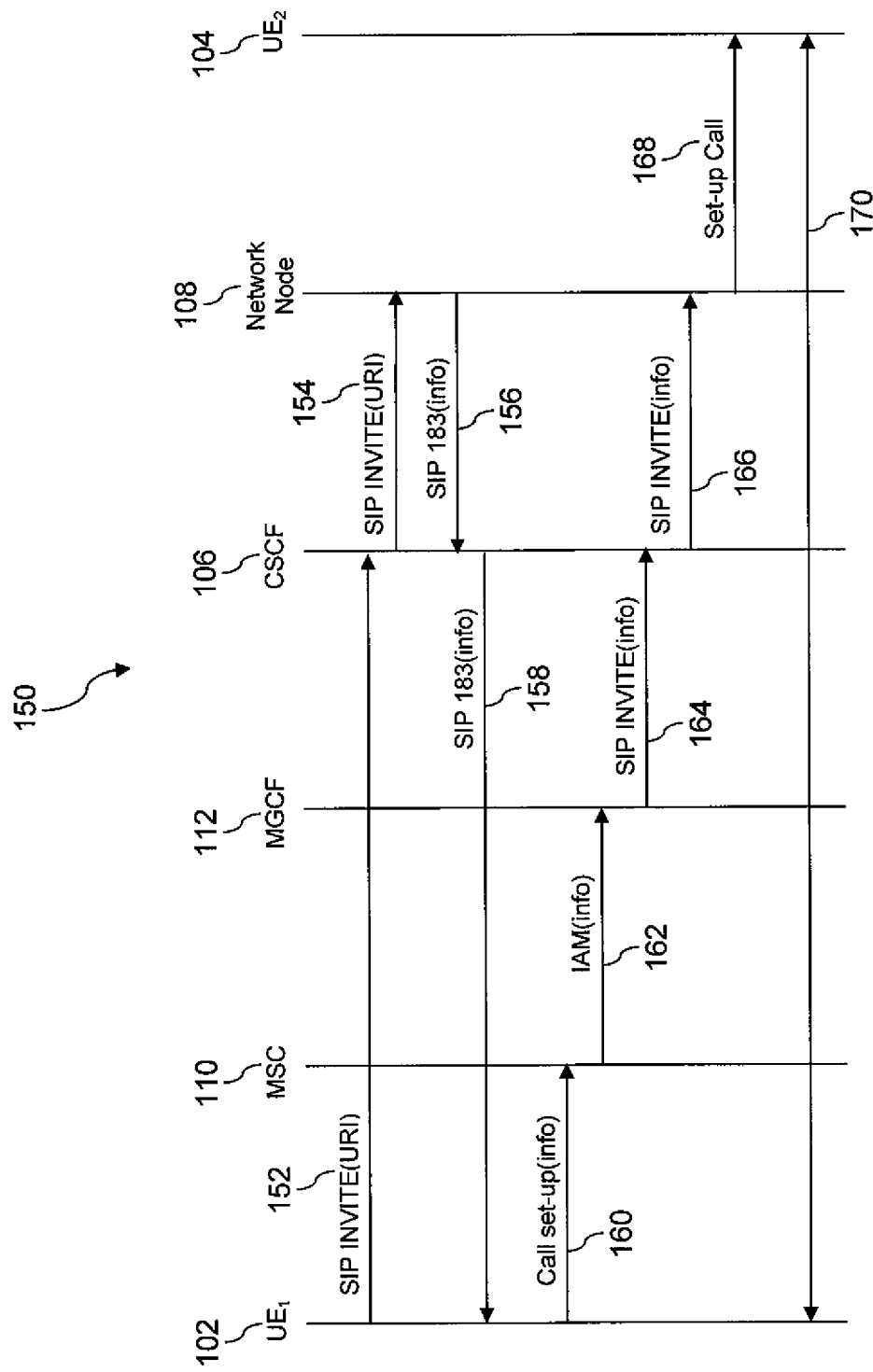
FIG. 2 illustrates a message sequence according to an embodiment of the disclosure.

Turning now to FIG. 2, a call flow 150 is illustrated. The first UE 102 sends a SIP INVITE message 152 containing a uniform resource identifier (URI) associated with the second UE 104 to the CSCF 106. The CSCF 106 forwards a SIP INVITE message 154 containing the URI associated with the second UE 104 to the network node 108. In an embodiment, the network node 108 may be an IMS application server (AS).

In an embodiment, the SIP INVITE messages 152, 154 may take forms such as illustrated in the two following examples:

A first SIP INVITE message example illustrating GRUU and the gr parameter being used to transport the dynamic ICS User Agent (IUA) PSI (DN):

```
INVITE sip:[5555::eee:fff:aaa:bbb]:8805; comp=sigcomp SIP/2.0
Via:
Max-Forwards: 63
Record-Route:
P-Asserted-Identity:
Privacy:
Supported:
From:
To:
Call-ID:
Caeq:
Require:
Supported:
Accept-Contact:*;+g.ims.ics;require;explicit
Contact:<sip:AS1.example.com;gr=+1-555-555-5555>;+g.ims.ics
Allow:
P-Called-Party-ID:
P-Media-Authorization:
Content-Type
Content-Length:
```

Another SIP INVITE message example illustrating use of a Contact parameter "+g.imis.ics.routing-num=" to transport the dynamic ICS User Agent (IUA) PSI (DN):

```
INVITE sip:[5555::eee:fff:aaa:bbb]:8805;comp=sigcomp SIP/2.0
Via:
Max-Forwards: 63
Record-Route:
P-Asserted-Identity:
Privacy:
Supported:
From:
To:
Call-ID:
Caeq:
Require:
Supported:
Accept-Contact:*;+g.ims.ics;require;explicit
Contact:<sip:AS1.example.com>;+g.ims.ics.routing-num="+1-555-555-5555"
Allow:
P-Called-Party-ID:
P-Media-Authorization:
Content-Type
Content-Length:
```

The network node 108 looks up one of an E.164 phone number and a private number plan (PNP) phone number to associate with the URI associated with the second UE 104. The E.164 number could be generated by a variety of means such as dynamically or some algorithm. In an embodiment, the number generated is stored and associated with the URI, and then the network node 108 returns the E.164 or PNP number as information in e.g. contact header or other header of a SIP response message, for example in a SIP 183 message 156. The number may be formatted in a variety of ways in the e.g. contact header or other header of the SIP 1XX message or other response message. The number may be included in the contact header as a human readable digit string. Alternatively, the number may be included in the contact header as a hash value that is produced by hashing the number with the digital identifier of the SIP session associated with the SIP INVITE message 152. The information may also include text or coded information identifying a reason for why the number information is included in the contact header of the SIP 1XX message. Some of the reasons may include IMS centralized services (CS) origination, IMS CS termination, and voice call continuity (VCC) invocation.

Those skilled in the art will appreciate that other SIP headers and SIP response messages can contain the E.164 number but below are several examples of how the number, either an E.164 number of a PNP number, may be formatted in the contact header of a SIP 1XX message:

the communication path between the first UE 102 and the second UE 104 may involve both a CS network path component and a PS network path component, for example when the first UE 102 is a mobile device and accesses the PS network via the radio access network and the MSC 110.

In the case that the +g.ims.ics.routing-num mechanism is not used, a feature tag can also be in the Contact Header such that the SIP UA is aware that the received contact is to be used for MT session but the wireless device is to use the CS domain from the bearer. Such a feature tag in the contact could be e.g. "+g.ims.ics". The feature tag ("g.ims.ics") can also be used in an Accept-Contact header to route to a UE that supports ICS in cases where multiple UEs are registered with the same public user identity and not all the UEs support ICS. In this case, the mechanisms in RFC 3840 and RFC 3841 are used by the UE to register the feature tag upon SIP registration and by the CSCF to route the request to the ICS supporting UE.

Figure 3:
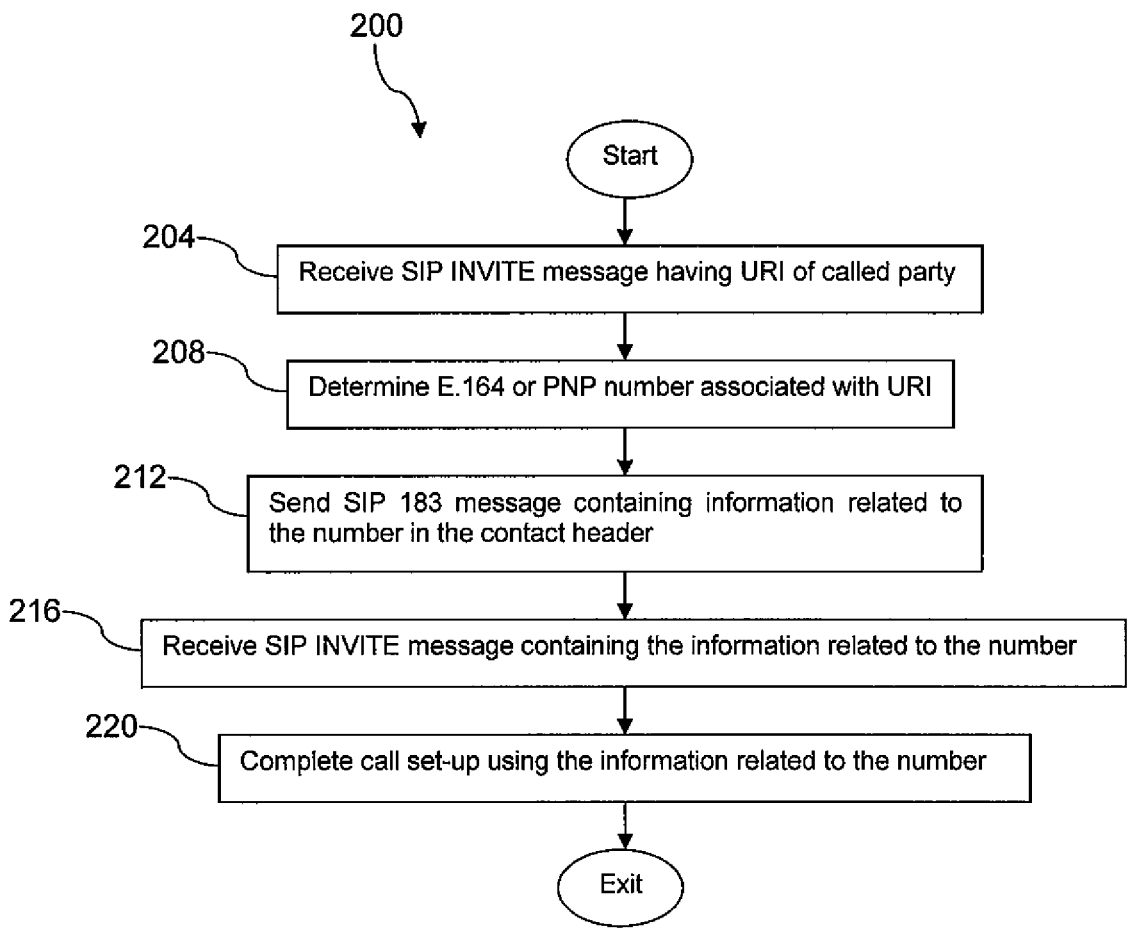
FIG. 3 is a flow chart of a method according to an embodiment of the disclosure.

Turning now to FIG. 3, a method 200 is described. At block 204, a SIP INVITE message having the URI of the called party is received. At block 208, either an E.164 or a PNP number associated with the URI is determined, for example

| | |
|---|---|
| Contact:<sip:AS1.example.com;gr=urn:tel:+1-555-555-5555> | Example 1 |
| Contact:<sip:+1-555-555-5555@AS1.example.com;user=phone> | Example 2 |
| Contact:<sip:+1-555-555-5555@AS1.example.com;user=phone;gr> | Example 3 |
| Contact:<sip:10.10.10.10;gr=urn:tel:+1-555-555-5555> | Example 4 |
| Contact:<sip:+1-555-555-5555@10.10.10.10;user=phone> | Example 5 |
| Contact:<sip:+1-555-555-5555@10.10.10.10;user=phone;gr> | Example 6 |
| Contact:<sip:5555@subregion.region.enterprise.com;user=phone> | Example 7 |
| Contact:<sip:5555555@region.enterprise.com;user=phone> | Example 8 |
| Contact:<sip:5555555555@enterprise.com;user=phone> | Example 9 |
| Contact:<sip:AS1.example.com;gr=tel:1-555-555-5555:afghi79ergf5jyzhhodg1ysg66kpobydgfsdhty> | Example 10 |
| Contact:<sip:AS1.example.com;gr=+1-555-555-5555>;+g.ims.ics | Example 11 |
| Contact:<sip:+1-555-555-5555@AS1.example.com;user=phone>;+g.ims.ics | Example 12 |
| Contact:<sip:+1-555-555-5555@AS1.example.com;user=phone;gr>;+g.ims.ics | Example 13 |
| Contact:<sip:10.10.10.10;gr=+1-555-555-5555>;+g.ims.ics | Example 14 |
| Contact:<sip:+1-555-555-5555A10.10.10.10;user=phone>;+g.ims.ics | Example 15 |
| Contact:<sip:+1-555-555-5555@10.10.10.10;user=phone;gr>;+g.ims.ics | Example 16 |
| Contact:<sip:10.10.10.10>;+g.ims.ics.routing-num="+1-555-555-5555" | Example 17 |

The network node 108 sends the SIP 183 message 156 containing the information to the CSCF 106. The CSCF 106 sends a SIP 183 message 158 containing the information to the first UE 102. The first UE 102 analyzes the SIP 183 message 158 to determine the number associated with the second UE 104. The number associated with the second UE 104 may be an E.164 number or the number may be a PNP number, for example when the first UE 102 and the second UE 104 are inside the same private phone network.

The first UE 102 sends a call set-up message 160 containing the number to the MSC 110. The MSC 110 sends an integrated services digital network user part (ISUP) initial address message (IAM) 162 containing the number to the MGCF 112. The call set-up message 160 and the IAM 162 may be sent over a CS network. The MGCF 112 sends a SIP INVITE message 164 containing the number to the CSCF 106. The CSCF 106 sends a SIP INVITE message 166 containing the number to the network node 108.

The network node 108 uses the number to associate the SIP INVITE message 166 with the earlier SIP INVITE message 154. Note that the SIP INVITE message 154 and the SIP INVITE message 166 belong to different SIP sessions or dialogs. In response to the SIP INVITE message 166, the network node 108 completes call set-up with the second UE 104. In message 170 the first UE 102 and the second UE 104 are shown in full duplex communication. In an embodiment, by looking up in a database or via a remote procedure call to an appropriate server or generating dynamically.

At block 212, a SIP response message, for example a SIP 183 message or other SIP 1XX message, is sent or transmitted containing the number looked up in block 208. In an embodiment, the number is included as information in a contact header or another header of the SIP informational message. In addition to the number, the information may also include a reason text or a reason code identifying a purpose associated with using the number. For example, the information may also encode one of an IMS CS origination reason, an IMS CS termination reason, a VCC invocation reason, or another reason. In an embodiment, the number may be hashed with a dialog identifier.

At block 216, a SIP INVITE message containing at least some of the information, for example the number or the hashed version of the number, is received. At block 220, a call set-up is completed using the number.

Figure 4:
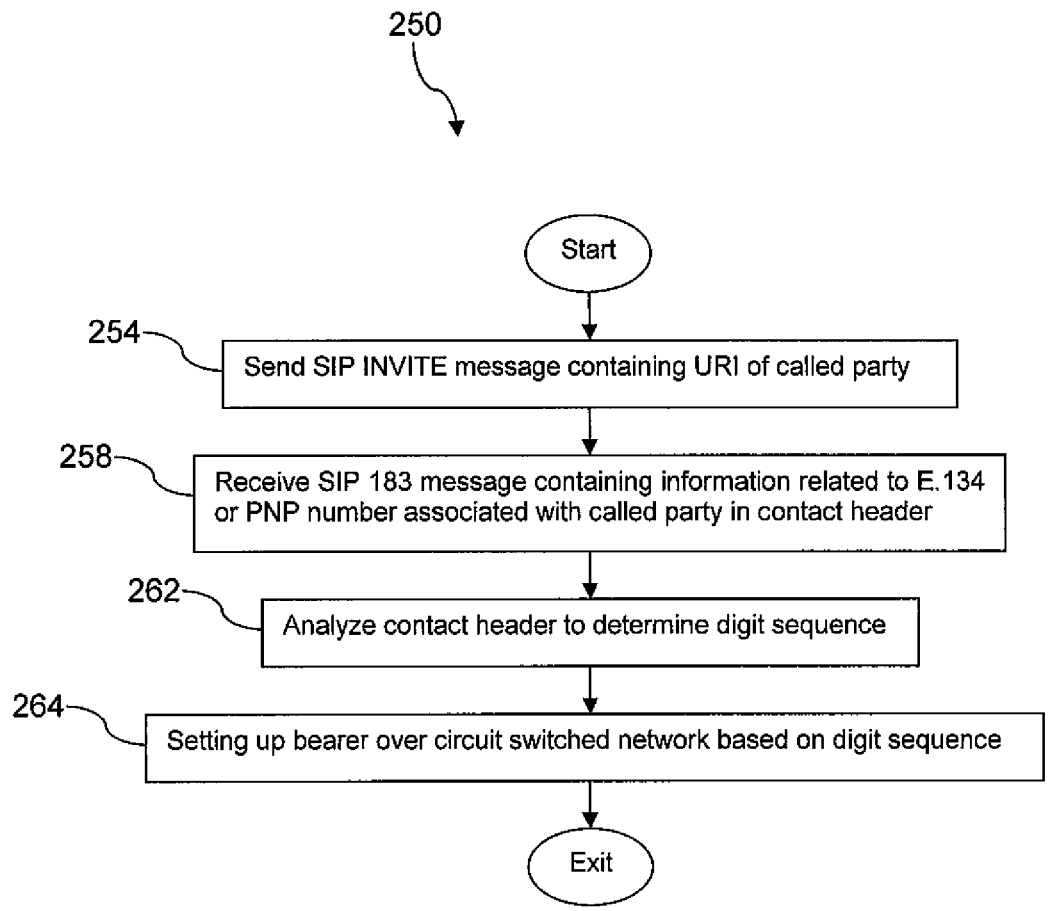
FIG. 4 is a flow chart of another method according to an embodiment of the disclosure.

Turning now to FIG. 4, a method 250 is discussed. At block 254, a SIP INVITE message containing the URI of a called party is sent. At block 258, a SIP informational message, for example a SIP 183 message, is received having a contact header containing information related to an E.164 or a PNP number associated with the called party.

At block 262, the contact header of the SIP response message is analyzed to determine the E.164 or the PNP number associated with the called party. If the SIP response message contact header or other header contains a SIP URI with user tag or user parameter having a value of phone and the SIP URI user name is in the format of a number string, then a domain part, including but not limited to, the contact header, Via, Record-Route, etc., is also analyzed to identify a possible reason code or reason text. A reason text may be provided in various formats, including, but not limited to, the following examples:

| | |
|---|---|
| CS origination | The digit string is for the purpose only for when a bearer needs to set-up over CS for MO origination |
| CS termination | The digit string is for the purpose only for when a bearer needs to set-up over CS when a MT origination has been received and the SIP UA needs to perform an MO operation to retrieve it |
| VCC invocation | VCC needs to be invoked and the bearer is being transferred into the CS domain |

These textual representations could equally be numerical representations. Alternatively to defining a new ICS feature tag, use could be made of the 3GPP defined ICSI or IARI feature tags, as per technical specification 24.229. A feature tag (ICSI, IARI) could also be used in the Contact header to indicate the VCC, CSI, ICS application.

If no additional information can be deduced from parsing the domain part of the contact header, it is assumed that the telephone number is to be used to originate a circuit switched bearer. If the SIP informational message contact header contains a SIP URI with no user=phone, the contact header is examined to determine if a gr parameter or gr tag is present. In one embodiment the E.164 or PNP number is included in a Contact header parameter (e.g a +g.ims.ics.routing-num feature tag). If a Contact header parameter (e.g +g.ims.ics.routing-num feature tag) is present and contains a telephone number it may be assumed that the telephone number is to be used to originate a circuit switched bearer.

The gr parameter is a known SIP URI parameter that can be included in a URI (known as a GRUU) in the contact header. If the gr tag is present and contains a telephone number or a URN (e.g. urn: tel) that represents a telephone number, it may be assumed that the telephone number is to be used to originate a circuit switched bearer. If a tel:URI is received in the Contact header, it may be assumed that the telephone number is to be used to originate a circuit switched bearer. As is known to one skilled in the art, the urn:tel: is only a portion of the URN. At block 264 a bearer for the call is set-up at least partly over a circuit switched network based on the E.164 or the PNP number associated with the called party.

Figure 5:
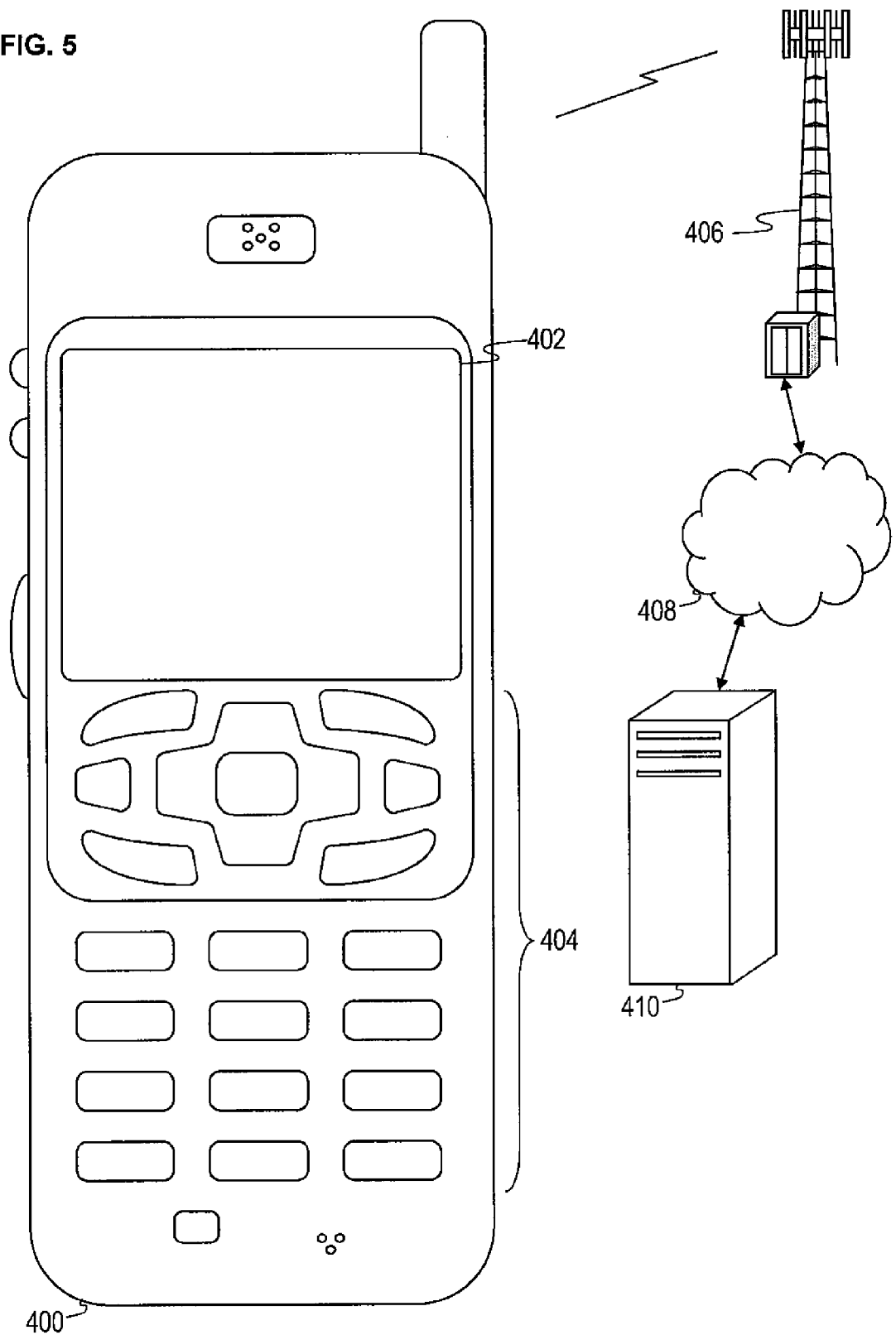
FIG. 5 is an illustration of a user equipment (UE) according to an embodiment of the disclosure.

FIG. 5 illustrates a handset 400, which could be a UE, for example the first or the second UE 102, 104, in communication with a wireless communications system. FIG. 5 depicts the handset 400, which is operable for implementing aspects of the present disclosure, but the present disclosure should not be limited to these implementations. Though illustrated as a mobile phone, the handset 400 may take various forms including a wireless handset, a pager, a personal digital assistant (PDA), a portable computer, a tablet computer, or a laptop computer. Many suitable handsets combine some or all of these functions. In some embodiments of the present disclosure, the handset 400 is not a general purpose computing device like a portable, laptop or tablet computer, but rather is a special-purpose communications device such as a mobile phone, wireless handset, pager, or PDA. The handset 400 may support specialized activities such as gaming, inventory control, job control, and/or task management functions, and so on.

The handset 400 includes a display 402 and a touch-sensitive surface or keys 404 for input by a user. The handset 400 may present options for the user to select, controls for the user to actuate, and/or cursors or other indicators for the user to direct. The handset 400 may further accept data entry from the user, including numbers to dial or various parameter values for configuring the operation of the handset. The handset 400 may further execute one or more software or firmware applications in response to user commands. These applications may configure the handset 400 to perform various customized functions in response to user interaction. Additionally, the handset 400 may be programmed and/or configured over-the-air, for example from a wireless base station, a wireless access point, or a peer handset 400.

The handset 400 may execute a web browser application which enables the display 402 to show a web page. The web page may be obtained via wireless communications with a cell tower 406, a wireless network access node, a peer handset 400 or any other wireless communication network or system. The cell tower 406 (or wireless network access node) is coupled to a wired network 408, such as the Internet. Via the wireless link and the wired network, the handset 400 has access to information on various servers, such as a server 410. The server 410 may provide content that may be shown on the display 402. Alternately, the handset 400 may access the cell tower 406 through a peer handset 400 acting as an intermediary, in a relay type or hop type of connection.

Figure 6:
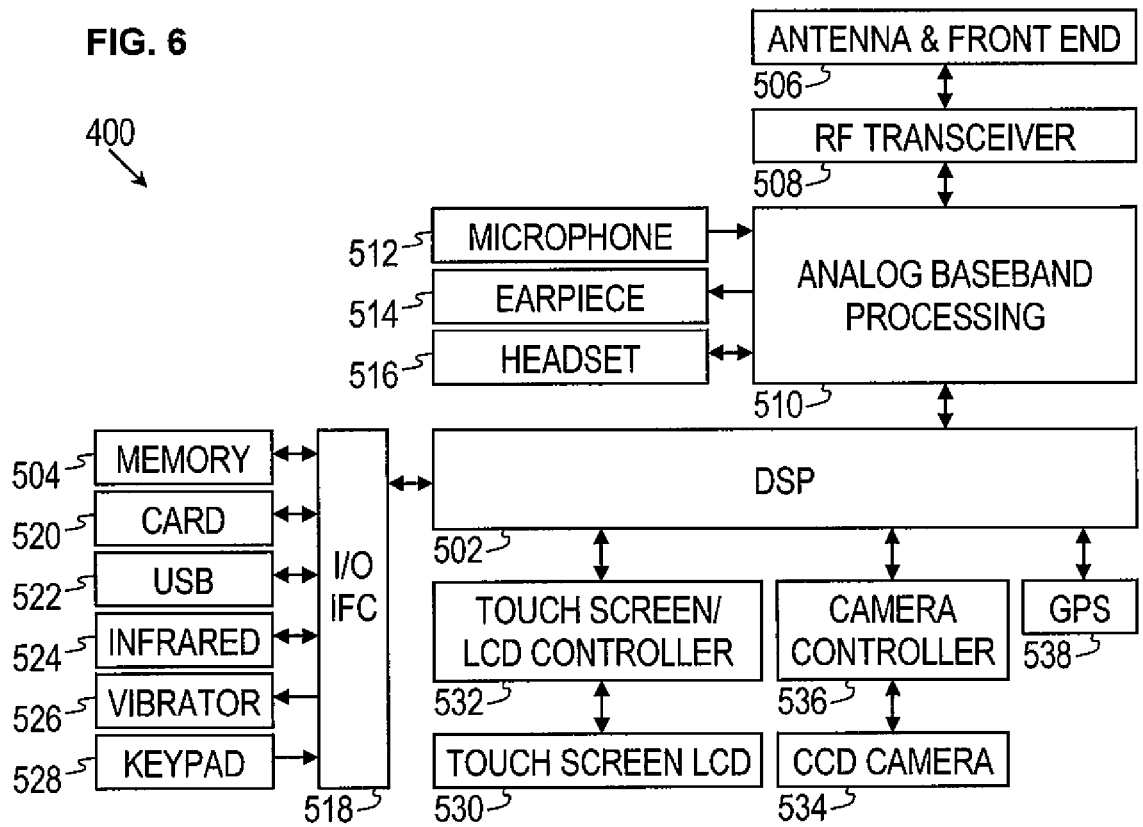
FIG. 6 is a block diagram of a UE according to an embodiment of the disclosure.

FIG. 6 shows a block diagram of the handset 400. While a variety of known components of handsets 102 are depicted, in an embodiment a subset of the listed components and/or additional components not listed may be included in the handset 400. The handset 400 includes a digital signal processor (DSP) 502 and a memory 504. As shown, the handset 400 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCOD) camera 534, a camera controller 536, and a global positioning system (GPS) sensor 538. In an embodiment, the handset 400 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the handset 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the handset 400 to send and receive information from a cellular network or some other available wireless communications network or from a peer handset 400. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 408, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the handset 400 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast fourier transforming (IFFT)/fast fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast fourier transforming, and cyclic prefix appending, and for a receiver function the DSP 502 may perform cyclic prefix removal, fast fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the handset 400 to function as a peripheral device to exchange information with a personal computer or other computer system. The infrared port 524 and other optional ports such as a Bluetooth interface or an IEEE 802.11 compliant wireless interface may enable the handset 400 to communicate wirelessly with other nearby handsets and/or wireless base stations.

The input/output interface 518 may further connect the DSP 502 to the vibrator 526 that, when triggered, causes the handset 400 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the handset 400. Another input mechanism may be the touch screen LCD 530, which may also display text and/or graphics to the user. The touch screen LCD controller 532 couples the DSP 502 to the touch screen LCD 530.

The CCD camera 534 enables the handset 400 to take digital pictures. The DSP 502 communicates with the CCD camera 534 via the camera controller 536. The GPS sensor 538 is coupled to the DSP 502 to decode global positioning system signals, thereby enabling the handset 400 to determine its position. In another embodiment, a camera operating according to a technology other than charge coupled device cameras may be employed. Various other peripherals may also be included to provide additional functions, e.g., radio and television reception.

Figure 7:
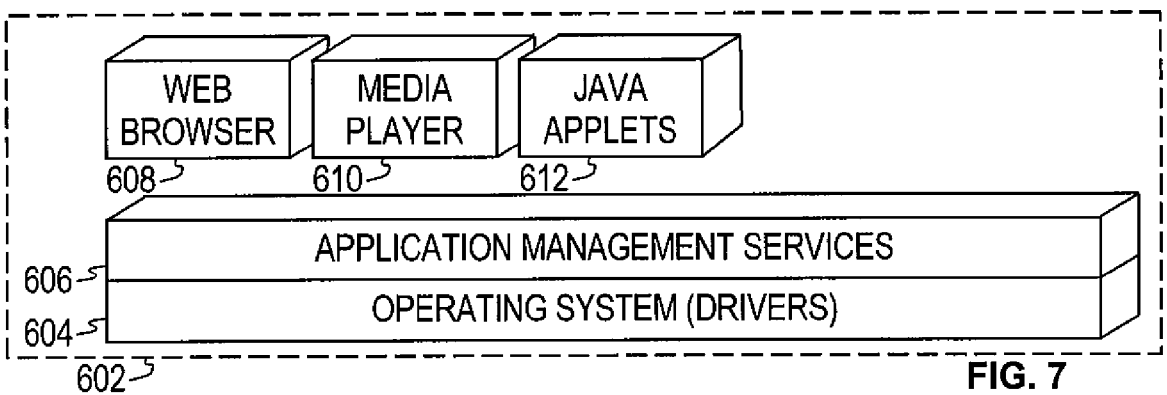
FIG. 7 is a block diagram of a software architecture of a UE according to an embodiment of the disclosure.

FIG. 7 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the handset 400. Also shown in FIG. 7 are a web browser application 608, a media player application 610, and JAVA applets 612. The web browser application 608 configures the handset 400 to operate as a web browser, allowing a user to enter information into forms and select links to retrieve and view web pages. The media player application 610 configures the handset 400 to retrieve and play audio or audiovisual media. The JAVA applets 612 configure the handset 400 to provide games, utilities, and other functionality.

Figure 8:
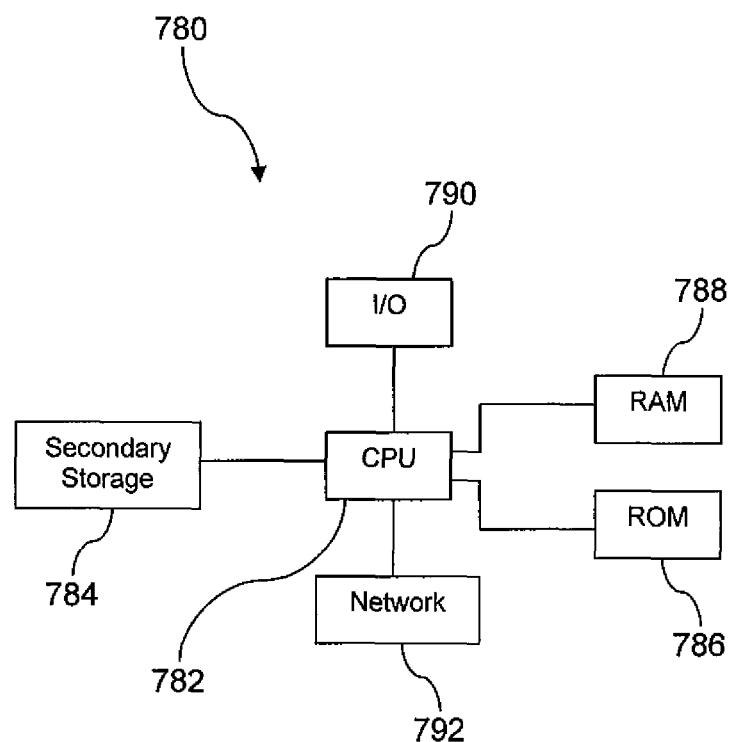
FIG. 8 illustrates an exemplary general purpose computer system suitable for implementing some aspects of the several embodiments of the disclosure.

The aspects of the system 100 described above may be implemented on any general-purpose computer with sufficient processing power, memory resources, and network throughput capability to handle the necessary workload placed upon it. FIG. 8 illustrates a typical, general-purpose computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor may be implemented as one or more CPU chips.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 792 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of call routing, comprising:
an application server receiving a first session initiation protocol (SIP) INVITE message that contains a uniform resource identifier (URI) of a called party and that identifies that a bearer for a call to the called party is to be set-up at least in part over a circuit switching domain, wherein the first SIP INVITE message is sent by a user equipment;
the application server determining a digit string associated with the URI of the called party; and
the application server sending a SIP response message having a SIP header that contains the digit string, the SIP header indicating a reason identifying the purpose for providing the digit string to the user equipment.

2. The method of claim 1, further including:
the application server receiving a second SIP INVITE message that contains the digit string, wherein the application server receives the first and second SIP INVITE messages from a call session control function; and
responsive to receiving the second SIP INVITE message, the application server completing call set-up with the called party using information based on the digit string.

3. The method of claim 1, wherein the SIP header contains information based on the digit string in a gr parameter formatted as a uniform resource name (URN).

4. The method of claim 3, wherein the SIP header is a Contact header.

5. The method of claim 1, wherein the SIP header contains information based on the digit string in a gr parameter formatted as a uniform resource name (URN).

6. The method of claim 4, wherein the Contact header contains the digit string and contains a user field having a parameter value of "phone."

7. The method of claim 4, wherein the Contact header further contains one of a domain part and a feature tag that indicates the reason explaining the purpose for providing the digit string.

8. The method of claim 7, wherein the reason is selected from one of internet protocol multimedia subsystem (IMS)

centralized services (CS) origination, IMS CS termination, and voice call continuity (VCC) invocation.

9. The method of claim 5, wherein the information includes a hash of one of an E.164 number and a PNP number.

10. The method of claim 9, wherein the hash is based on a Dialog ID associated with the SIP INVITE message and the SIP response message.

11. The method of claim 1, wherein the SIP response message is a SIP 183 message sent to the user equipment via a call session control function (CSCF), wherein the first SIP INVITE message from the user equipment is sent to the application server via the CSCF.

12. A method of setting up a bearer over a circuit switched network, comprising:
a user equipment sending a session initiation protocol (SIP) INVITE message that contains a uniform resource identifier (URI) of a called party, wherein the SIP INVITE message is sent to an application server;
the user equipment receiving a SIP response message related to the SIP INVITE message, wherein the SIP response message has a contact header that contains a digit string provided by the application server, the contact header indicating a reason identifying the purpose for providing the digit string to the user equipment;
the user equipment analyzing the contact header of the SIP response message to determine a digit sequence associated with the called party; and
the user equipment sending a call set-up message for setting up the bearer over the circuit switched network using the digit sequence.

13. The method of claim 12, wherein when a user field of the contact header contains a value of "phone" and a SIP URI field of the contact header is in the format of the digit string, the analyzing includes analyzing a domain part of the contact header to determine information of what the digit string should be used for.

14. The method of claim 13, wherein the information of what the digit string should be used for is one of an internet protocol multimedia subsystem (IMS) centralized services (CS) origination, an IMS CS termination, and a voice call continuity (VCC) invocation.

15. The method of claim 12, wherein when a user field of the contact header does not contain a value of "phone," the analyzing includes analyzing a gr field of the contact header to determine the digit sequence.

16. The method of claim 12, wherein analyzing the contact header of the SIP response message to determine the digit sequence includes analyzing a SIP URI field to determine one of a E.164 number and a PNP number.

17. The method of claim 12, wherein the SIP response message is a SIP 183 message from the application server and sent to the user equipment via a call session control function (CSCF), wherein the SIP INVITE message from the user equipment is sent to the application server via the CSCF.

18. A user equipment (UE), comprising:
a component configured to:
transmit a session initiation protocol (SIP) INVITE message containing a uniform resource identifier (URI) of a called party and that identifies that a bearer for a call to the called party is to be set-up at least partially over a circuit switched domain, wherein the SIP INVITE message is sent to an application server,
receive a SIP informational response message having a contact header that contains information based on a digit string provided by the application server, the contact header indicating a reason identifying the purpose for providing the information based on the digit string,
analyze the information contained in the contact header based on the digit string to determine one of an E.164 number and a private number plan (PNP) number associated with the called party, and
transmit a call set-up message to a mobile switching center (MSC), the call set-up message containing the one of the E.164 number and the PNP number,
wherein the UE promotes setting-up a bearer over the circuit switched domain.

19. The UE of claim 18, wherein the SIP informational response message is a SIP 183 message from the application server and sent to the user equipment via a call session control function (CSCF), wherein the SIP INVITE message from the user equipment is sent to the application server via the CSCF.

20. The UE of claim 18, wherein the information based on the digit string is a hash of a SIP Dialog ID and the one of the E.164 number and the PNP number.

21. The UE of claim 18, wherein the contact header includes a domain that identifies a reason to use the information based on the digit string.

22. The UE of claim 21, wherein the reason to use the information based on the digit string comprises one of an internet protocol multimedia subsystem (IMS) centralized services (CS) origination, an IMS CS termination, and a voice call continuity (VCC) invocation.

23. The UE of claim 18, wherein the information based on the digit string is one of the E.164 number and the PNP number, and wherein the one of the E.164 number and the PNP number is contained in one of a SIP URI field of the contact header and a gr parameter of the contact header.

24. A server, comprising:
a component to:
receive a first session initiation protocol (SIP) INVITE message that contains a uniform resource identifier (URI) of a called party and that identifies that a bearer for a call to the called party is to be set-up at least in part over a circuit switched domain, wherein the first SIP INVITE message is sent by a user equipment
determine one of an E.164 number and a private number plan (PNP) number associated with the URI of the called party,
send a SIP informational response message having a contact header that contains information based on the one of the E.164 number and the PNP number, wherein the contact header indicates a reason identifying to the user equipment the purpose for providing the one of the E.164 number and the PNP number,
receive a second SIP INVITE message that contains the information based on the one of the E.164 number and the PNP number, and
complete call set-up between the user equipment and the called party in response to using the information based on the one of the E.164 number and the PNP number to associate the second SIP INVITE message with the first SIP INVITE message.

25. The server of claim 24, wherein the contact header further contains one of a domain part and a feature tag that indicates the reason explaining the purpose for providing the one of the E.164 number and the PNP number.

26. The server of claim 25, wherein the reason is selected from one of internet protocol multimedia subsystem (IMS) centralized services (CS) origination, IMS CS termination, and voice call continuity (VCC) invocation.

27. The server of claim 24, wherein the information based on the one of the E.164 number and the PNP number is a hash of the one of the E.164 number and the PNP number.

28. The server of claim 24, wherein the SIP informational response message is a SIP 183 message sent to the user equipment via a call session control function (CSCF), wherein the first SIP INVITE message from the user equipment is sent to the application server via the CSCF.

* * * * *